United States Patent [19]

Kemper et al.

[11] Patent Number: 4,641,299

[45] Date of Patent: Feb. 3, 1987

[54] MECHANIZED LOOP TESTING USING A LOCAL METALLIC ACCESS PORT

[75] Inventors: Kyran B. Kemper, Mendham; Robert W. Vetter, Jr., Morristown, both of N.J.

[73] Assignees: AT&T Company; AT&T Bell Laboratories, both of Murray Hill, N.J.

[21] Appl. No.: 652,640

[22] Filed: Sep. 21, 1984

[51] Int. Cl.[4] .......................... H04J 1/16; H04J 3/14
[52] U.S. Cl. ........................................ 370/15; 370/13; 379/29
[58] Field of Search .................... 370/15, 13, 76; 179/175.2 R, 175.2 C, 175.2 D, 175.3 R

[56] References Cited

U.S. PATENT DOCUMENTS

| | | | |
|---|---|---|---|
| 3,571,530 | 3/1971 | Davies | 179/175.2 |
| 3,980,839 | 9/1976 | Hutcheson | 179/175.2 R |
| 4,112,264 | 9/1978 | Abramson et al. | 179/175.3 R |
| 4,258,236 | 3/1981 | Conklin et al. | 179/175.3 R |
| 4,424,421 | 1/1984 | Townsend et al. | 179/175.2 |

*Primary Examiner*—Douglas W. Olms
*Assistant Examiner*—Wellington Chin
*Attorney, Agent, or Firm*—Patrick E. Roberts; Robert O. Nimtz

[57] ABSTRACT

In a telephone local exchange system where loops are connected to a remote switch which in turn homes on a host switch via a carrier system and where the distance between the ends of the loops and the host switch exceeds a threshold, the loops may be tested by locating the test apparatus remotely from the host switch so that the distance between the free ends of the loops and the test apparatus is below the threshold and so that a metallic pair of conductors may be used therebetween to permit some tests which cannot be done using carrier facilities. In order to establish a connection between the test apparatus and the loops, signals are transferred over two dedicated carrier channels between the test apparatus and the host switch via two applique circuits. These applique circuits make it appear to the test system as if the remote switch (or carrier RT or concentrator) support a test trunk. This makes it possible to use test hardware designed for use with local exchange offices with these remote units without modification to the test system itself.

14 Claims, 9 Drawing Figures

(SHOWN FOR USE WITH 1ESS HOST — SEE FOOTNOTES FOR 2ESS HOST)

| STATE | MLT T | MLT R | MLT S | RS APPLIQUE T | RS APPLIQUE R | RS APPLIQUE S | HOST APPLIQUE T | HOST APPLIQUE R | HOST APPLIQUE S | NO-TEST TRUNK T | NO-TEST TRUNK R | NO-TEST TRUNK S |
|---|---|---|---|---|---|---|---|---|---|---|---|---|
| A-IDLE | OPEN | OPEN | $-I_H$ | GRD | -48 | OPEN | OPEN | OPEN | $-I_H$ | GRD | -48 | OPEN |
| B-BRIDGE | BRIDGE | | $-I_H$ | *GRD | -48 | OPEN | BRIDGE | | $-I_H$* | GRD | -48 | OPEN |
| C-FIRST REVERSAL (MLT MF DIALS) | BRIDGE | | $-I_H$ | -48 | GRD | OPEN | BRIDGE | | $-I_H$* | -48 | GRD | OPEN |
| D-SECOND REVERSAL (CLOSE SLEEVE) | BRIDGE | | $-I_H$ | *GRD | -48 | CLOSE | BRIDGE | | $-I_H$* | GRD | -48 | CLOSE |
| E-START OF CUT-THROUGH | BRIDGE | | NOT $-I_H$ | *GRD | -48 | CLOSE | BRIDGE | | OPEN* | GRD | -48 | CLOSE |
| F-MIDDLE OF CUT-THRU (BUSY TESTS PERFORMED (i.e. RING TO GRD ON NO-TEST TRUNK CHECKED)) | OPEN | OPEN | $-I_L$ | OPEN | OPEN | CLOSE | BUSY DETECT CIRCUIT | | $-I_L$ | OPEN OR TONE | OPEN OR GRD | CLOSE |
| J-CUT THRU SUCCESSFUL | TESTING | | $-I_L$ | RS TIP | RS TIP | CLOSE | DIRECT PATH TO 2-WIRE CIRCUIT | | $-I_L$ | OPEN | OPEN | CLOSE |
| H-RING-GRD SHORT DETECT AT NO-TEST TRUNK | BUSY DETECT CIRCUIT | | $-I_L$ | TONE | GRD | CLOSE | DIRECT PATH TO 2-WIRE CIRCUIT | | $-I_L$ | TONE | GRD | CLOSE |

* = $I_L$ FOR 2ESS

FIG. 7  (SHOWN FOR USE WITH 1ESS HOST – SEE FOOTNOTES FOR 2ESS HOST)

| STATE | MLT T | MLT R | MLT S | RS APPLIQUE T | RS APPLIQUE R | RS APPLIQUE S | HOST APPLIQUE T | HOST APPLIQUE R | HOST APPLIQUE S | NO-TEST TRUNK T | NO-TEST TRUNK R | NO-TEST TRUNK S |
|---|---|---|---|---|---|---|---|---|---|---|---|---|
| I-RING-GRD OPEN AT NO-TEST TRUNK | BUSY DETECT CIRCUIT | | $-I_L$ | TONE | TONE | CLOSE | DIRECT PATH TO 2-WIRE CIRCUIT | | $-I_L$ | TONE | TONE | CLOSE |
| L-LINE CIRCUIT TEST | TESTING | | OPEN | RSS TIP | RSS RING | CLOSE | DIRECT PATH TO 2-WIRE CIRCUIT | | OPEN | OPEN | OPEN | CLOSE |
| M-TOUCH-TONE Ⓡ CIRCUIT TEST | TESTING | | $+I_H$ | 2-WIRE CIRCUIT TO HOST NO TEST TRUNK | | CLOSE | DIRECT PATH TO 2-WIRE CIRCUIT | | $+I_H$ | RESPONSE TONES | | CLOSE |
| K-DISCONNECT | OPEN | OPEN | $-I_H$ | NO CHANGE FROM INPUT | | CLOSE | DIRECT PATH TO 2-WIRE CIRCUIT | | $-I_H$ | OPEN | OPEN | CLOSE |
| NO-TEST TRUNK ERROR STATES | | | | | | | | | | | | |
| W- | BRIDGE | | $-I_H$ * | GRD | -48 | OPEN | BRIDGE | | $-I_H$ * | OPEN | OPEN | OPEN |
| X- | BRIDGE | | $-I_H$ * | GRD | -48 | CLOSE | BRIDGE | | $-I_H$ * | GRD | -48 | CLOSE |
| Y- | BRIDGE | | $-I_H$ * | GRD | -48 | CLOSE | BRIDGE | | $-I_H$ * | OPEN | OPEN | CLOSE |
| Z-HARDWARE FAULT DETECTED | | | | GRD | -48 | OPEN | OPEN | OPEN | OPEN | | | |

* = $I_L$ FOR 2ESS

MECHANIZED LOOP TESTING USING A LOCAL METALLIC ACCESS PORT

TECHNICAL FIELD

This invention relates to loop testing systems and, in particular, to methods and apparatus for transferring signals between a test apparatus located remotely from a host telephone switching office and the host office in order to establish a metallic path between the test apparatus and any one of a plurality of telephone loops which home on a remote telephone switch or the remote terminal of a carrier system or concentrator.

BACKGROUND OF THE INVENTION

In the telephone loop plant today, telephone loops are terminated on remote telephone switches or remote terminals of carrier systems or concentrators. The remote switch, however, obtains control for many of its functions from a host telephone switch to which it is connected via a carrier system; both remote switch and host switch are typcially electronic switches. In order to perform certain tests on the telephone loops, however, a metallic path is provided between the test apparatus which is located at the host switch, and the remote switch, bypassing the carrier system.

When the remote switch is located beyond a predetermined distance, tests may not be conducted over the aforesaid metallic path. In such cases, it is desirable to locate the test apparatus remotely from the host switch so that the distance between the test apparatus and the station apparatus at the end of the telephone loop falls below the aforesaid predetermined distance. Additionally, it is necessary to devise a method for permitting the test apparatus to access the telephone loops.

SUMMARY OF THE INVENTION

In accordance with the illustrative embodiment of the present invention, when the distance between a host telephone switch and the ends of telephone loops provided service therefrom exceed a threshold impedance, apparatus to test the loops is located remotely from the host telephone switch. The test apparatus may be located at a remote switch or remotely from the remote switch. The distance between the test apparatus and the ends of the telephone loops must, in the preferred embodiment, remain within three thousand ohms. Usually, the distance between the test apparatus and the remote switch and the distance between the remote switch and the ends of the loops are each limited to fifteen hundred ohms.

The test apparatus which is located remotely from the host switch is permitted to access telephone loops which are connected to the remote switch by the use of two applique circuits: one applique circuit is located at the remote switch and the other is located at the host switch. The applique circuits transmit signals between the remotely located test apparatus and a no-test trunk at the host switch in order to establish a connection between the test equipment and the telephone loops.

Each applique has a microcomputer control circuit, a universal asynchronous receiver transmitter and a modem which, along with a four wire channel unit at each end and a dedicated carrier channel, form a data link between the two applique circuits for transferring status messages therebetween. The data link is a 1200 baud full duplex link. The status messages are transferred in a format comprising four characters: the first character serves as a header, the second character indicates the present state, the third character indicates the next state, and the fourth character serves as a checksum for the first three, the binary sum of the four characters being zero. Each character is sent in a frame comprising one start bit, eight data bits, and one stop bit.

When the remote test apparatus is ready for testing a loop, a request for a host multi-frequency dual receiver is sent. This is implemented by a circuit being bridged across the tip and ring conductors of the remote applique wherein a flow of current is detected. The tip conductor is at ground potential and the ring conductor is at −48 V. This state is then relayed to the host applique by way of a status message over the data link. At the host applique, this message is then repeated to the no-test trunk by bridging a similar circuit across the tip and ring conductors therein, thereby duplicating the state at the remote applique. Thus the two appliques act to repeat the messages between the no-test trunk and the mechanized loop test apparatus, and appear transparent to the the no-test trunk circuit and the mechanized loop test apparatus.

When a receiver is available, the polarity of the tip and ring conductors is reversed from the host no-test trunk. This information is relayed to the test apparatus via the two appliques. Thus, the polarity reversal is duplicated to the test apparatus.

The address of the loop to be tested is then sent by the test apparatus by outpulsing the frequencies for the address. This address is then repeated to the host applique via an alternating current coupler. At the host applique, a host alternating current coupler repeats the address of the loop to the no-test trunk. The two alternating current couplers consist of a second dedicated carrier channel comprising a pair of two wire channel units. The alternating current couplers are also used for repeating other tone based messages, such as an overflow from the host switch to the test apparatus.

After the remote applique sends the complete address of the loop to the host applique the multifrequency dual receiver is removed from the no-test trunk by the host. This removal is accompanied by a second tip-ring polarity reversal. If a busy condition (overflow, interrupt) is not detected by the host applique from the no-test trunk within a predetermined period, a switch is operated to connect the test apparatus directly with the remote switch.

The functions provided by other components of the applique circuits will become clear by a reading of the detailed description.

In another embodiment of the present invention, the mechanized loop test apparatus is shared by many remote switches which all home on the same host switch. Each remote switch will then have its own remote applique circuit. At the host switch, there is also provided a separate host applique circuit for each remote switch.

In yet another embodiment of the present invention, the central office terminal of a subscriber loop carrier system is connected to the remote switch in lieu of the loop and the loop is connected to the remote terminal of the subscriber loop carrier system. A pair gain test controller appearing between the remote test apparatus and the remote applique circuit provides a direct metallic path between the remote test apparatus and the loop via a metallic bypass pair to the remote terminal of the subscriber loop carrier system. An advantage of the present invention is the use of centralized common equipment by providing two applique circuits which appear transparent to existing equipment.

DETAILED DESCRIPTION

Figure 1:
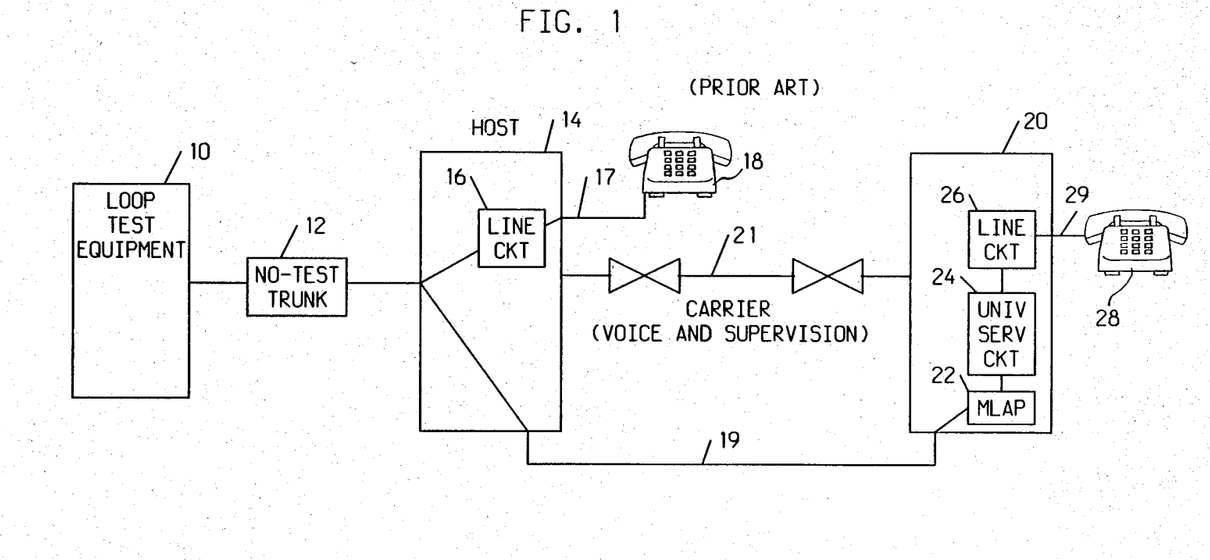
FIG. 1 shows the prior art system for testing telephone loops which home on a remote switch.

Referring to FIG. 1, there is shown a mechanized loop test equipment 10 which is connectable via no-test trunk circuit 12 to host telephone switch 14. Station set 18, representative of a plurality of such sets, is shown homing directly on host switch 14 via telephone loop 17 and line circuit 16. Because loop 17 is designed to be less than a predetermined distance from host switch 14, test equipment 10 is capable of performing mechanized tests on loop 17 and set 18.

Remote switch 20 homes on host switch 14 via carrier system 21. Remote switch 20 supports telephone station set 28, which is representative of many others, via telephone loop 29 and line circuit 26. When a test of the loops homing on remote switch 20 is to be performed, loop test equipment 10 is connected via metallic path 19, bypassing carrier system 21 through metallic loop access port 22 and universal service circuit 24, to loop 29. A problem arises, however, when the distance between station set 28 and loop test equipment 10 exceeds a predetermined value.

Figure 2:
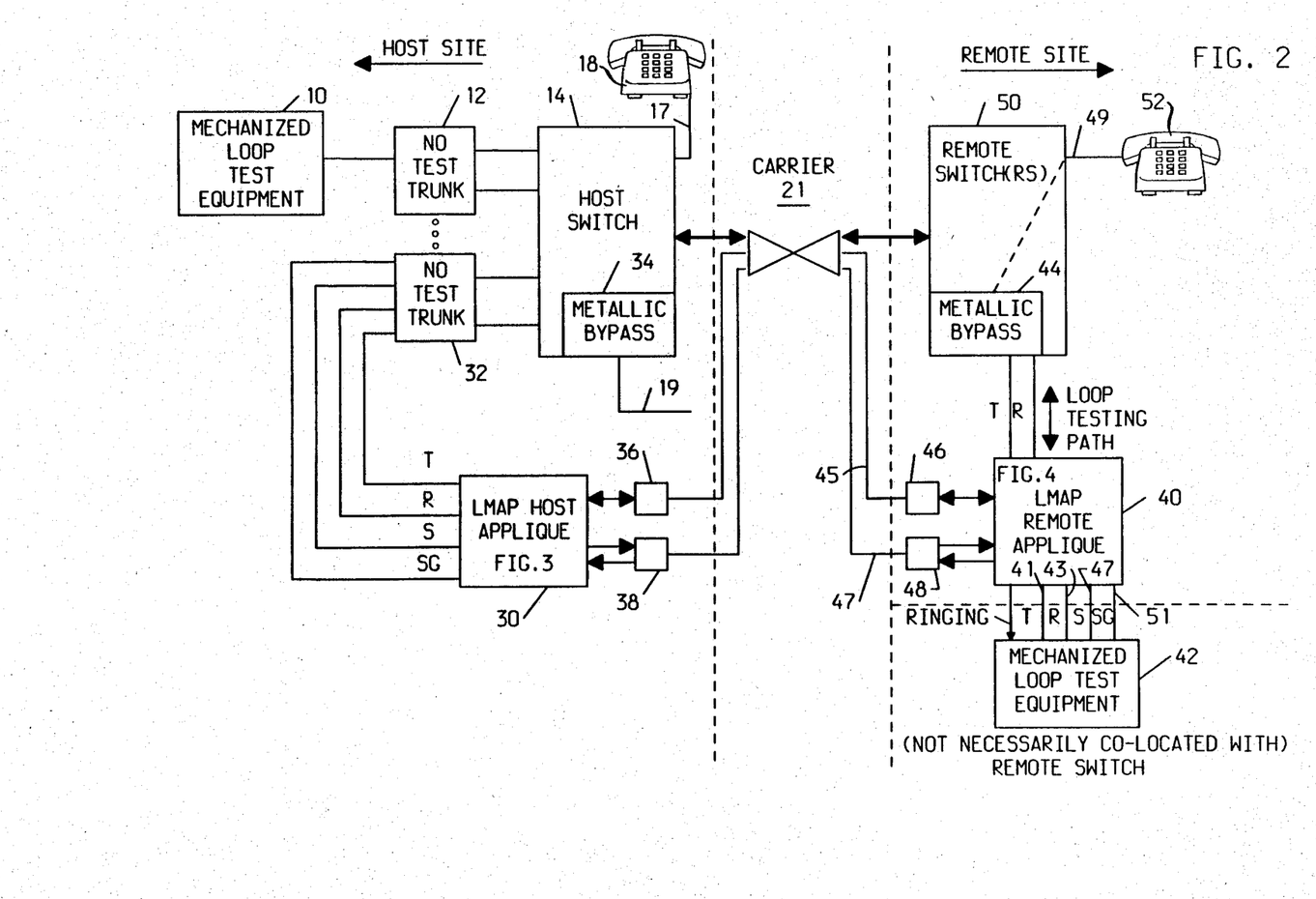
FIG. 2 shows a system for connecting a test apparatus located remotely from a host switch with telephone loops which home on a remote switch.

Referring to FIG. 2, remote switch 50 is shown beyond a predetermined distance from host switch 14. Mechanized loop test equipment 10, as in FIG. 1, is located at host switch 14 and is called upon to test loops 17 when the loops are within a predetermined distance from host switch 14, as stated hereinabove. In order to test loops 49 and station set 52, which are representative of many others, test equipment 42 is used. Test equipment 42, located remotely from host switch 14, may be located at remote switch 50 or located elsewhere. Test equipment 42 must, however, be switched via remote switch 50 to loops 49 for testing the loops. Where the loops are connected via a pair gain system (not shown in FIG. 2), the test path will bypass remote switch 50 and go directly from test equipment 42 via a metallic path to a remote concentrator terminal and then to the loops.

Remote switch 50, is not a self supporting switch but depends on host switch 14 for many of its control functions. Furthermore, in order to minimize costs, no-test trunk equipment 12 . . . 32, required for access to loop 49, are not duplicated but are located centrally, at host switch 14. In order to establish a connection between test equipment 42 and loops 49, two applique circuits are used: applique circuit 40 at the location of remote switch 50 and applique circuit 30 at the location of host switch 14.

Figure 3:
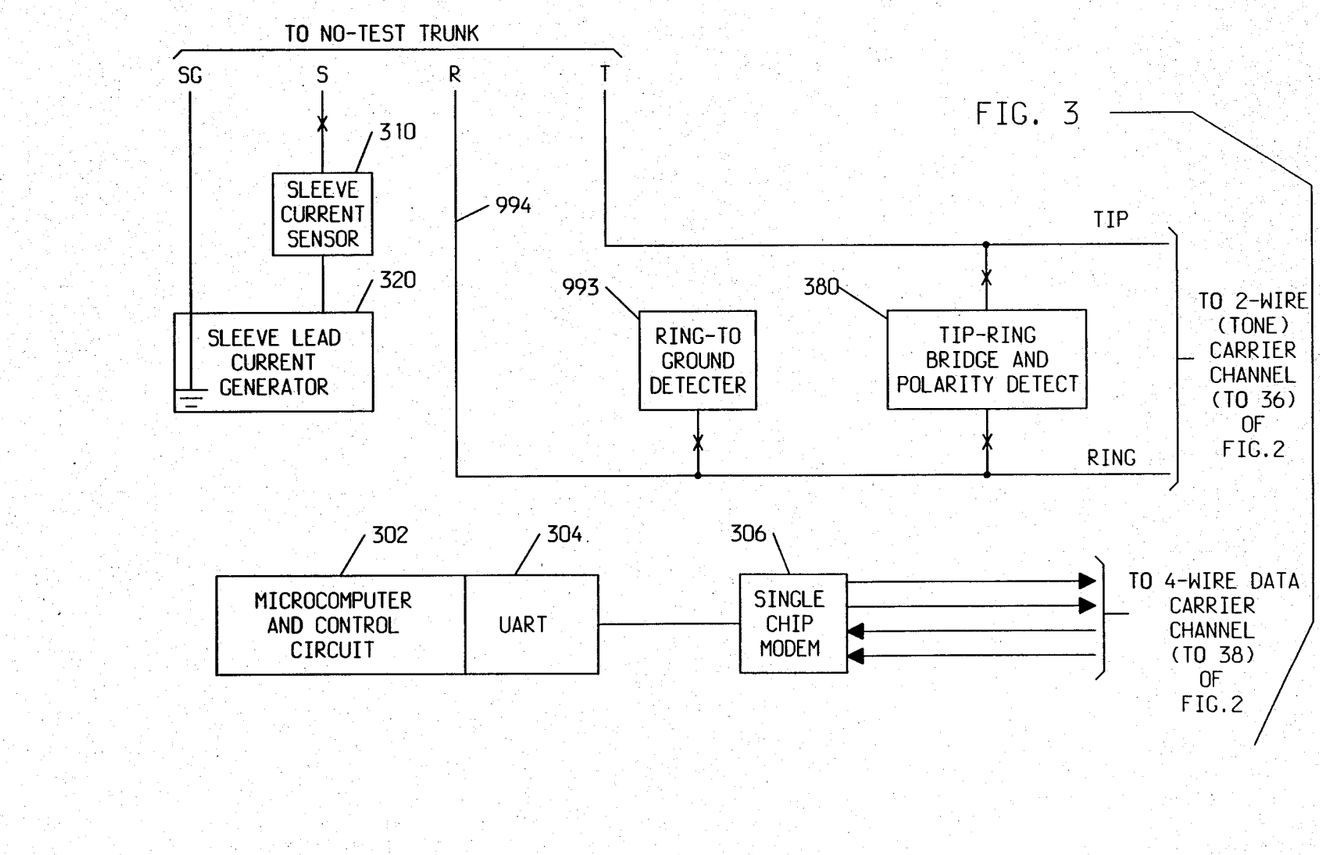
FIG. 3 shows the applique circuit at the host switch of FIG. 2.
Figure 4:
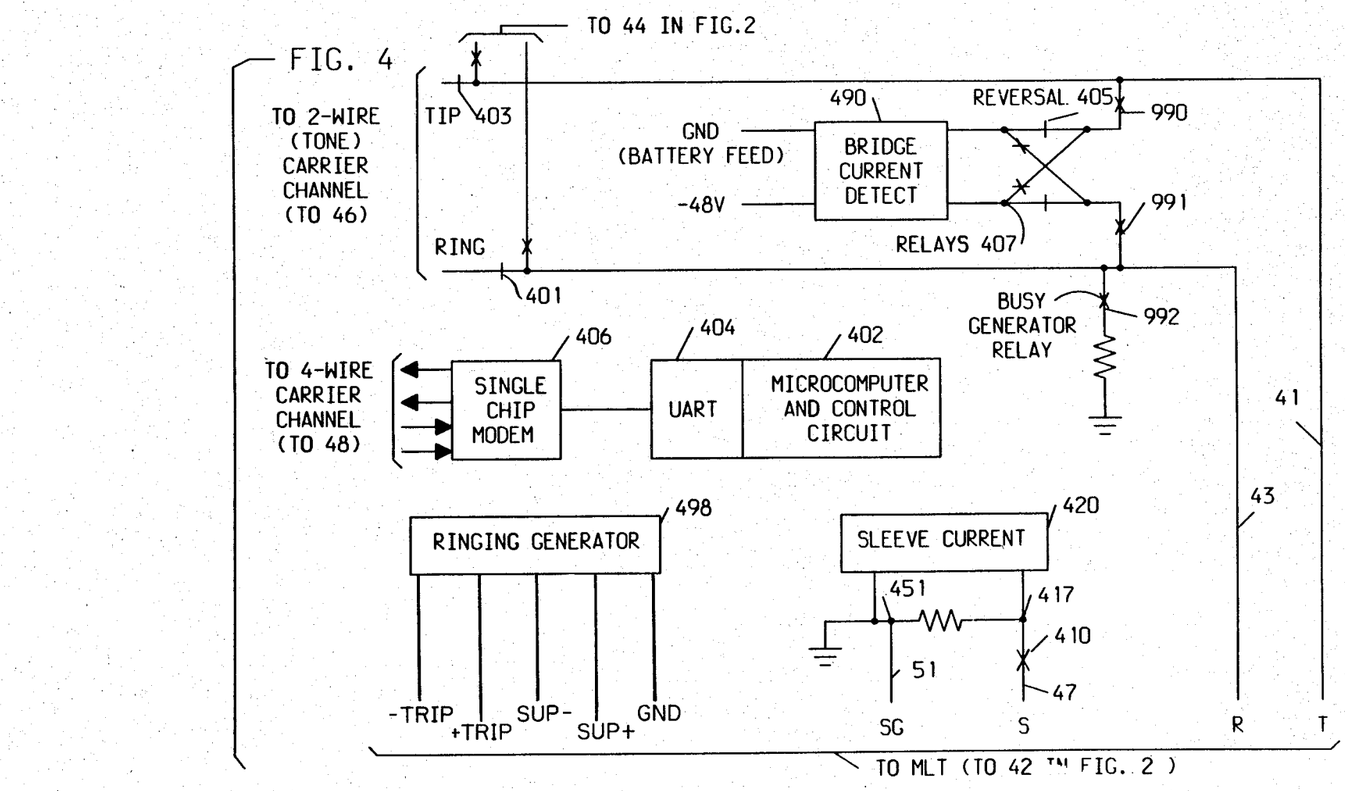
FIG. 4 shows the applique circuit at the remote switch of FIG. 2.

Data signals between remote applique 40 and host applique 30 are sent via a path comprising four wire channel unit 48, a dedicated carrier channel and four wire channel unit 38. Referring to FIGS. 2, 3 and 4, this path may be a 1200 baud date link between the two applique circuits 40 and 30 for enabling microprocessor 402 in remote applique 40 and microprocessor 302 located in applique circuit 30 to communicate with each other. The aforesaid microprocessors 402 and 302 will sequence through a series of states, shown in FIGS. 5, 6 and 7 as the testing of a loop progresses from access through to disconnect. Microprocessors 402 and 302 will be locked in step, each aware of actions performed by the other.

During the idle state at remote applique 40, ground potential will be applied to tip lead 41 and −48 volts potential will be applied to ring lead 43. When a loop, such as 49, is to be tested, mechanized loop test equipment (MLT) 42 will be bridged on to leads 51, 47, 41 and 43, thereby indicating that a multi-frequency (MF) receiver is needed, causing current to flow through tip and ring current sensor 490. This current flow is detected by microcomputer 402 and A to B message is transmitted to host microcomputer 302 over the aforesaid data link. When host microcomputer 302 responds with a B to C message, relays 405 and 407 will be operated to reverse the battery connections by connecting −48 volts to tip lead 41 and ground to ring lead 43. Thereafter, MLT 42 will outpulse the address of station apparatus 52 by way of MF tones via the two wire dedicated carrier channel 45 to host switch 14 requesting thereby a connection to be made between MLT 42 and loop 49 via remote switch 50. After the dialing sequence is completed and the appropriate state messages have been exchanged between microprocessors 302 and 402, relays 405 and 407 will be operated again to connect −48 volts to ring lead 43 and ground to tip lead 41.

Microcomputer 402 will open and close the connection between sleeve leads 417 and 47 by operating relay 410. Thus, by operating sleeve switch 410, MLT 42 may be either connected or disconnected from sleeve lead current sensor 420. Microcomputers 402 will monitor the five possible sleeve currents from sensor 420: open, low negative, low positive, high negative and high positive. Changes in sleeve currents will initiate a state change and host applique 30 will be notified of the state change via the data link so that the sleeve current change may be mimicked, that is repeated, to no-test trunk 32.

During loop testing, relays 401 and 403 will connect MLT 42 with remote switch 50 via the metallic bypass circuit 44 and loop testing will proceed normally. Also during loop testing, relays 990 and 991 will be opened to remove any battery feed from conductors 41 and 43. During the access stage, described above, relays 990 and 991 connect MLT 42 with sensor 490. Also during the access stage, relays 401 and 403 will connect MLT 42 with two wire channel unit 46 for AC signalling.

In the event that access of loop 49 is denied to MLT 42, via host 14 and no-test trunk 12, ring conductor 994 will be shorted to ground by no-test trunk 32. A continuous short is indicative of an office interrupt condition associated with loop 49. A flashing short is indicative of an office overflow or other error conditions associated with host 14. The flashing condition will be alternating ring-to-ground shorts and ring-to-ground opens at either 60 or 120 interruptions per minute (ipm). The 120 ipm rate is associated with office overflow. The 60 ipm rate is associated with an error condition with host 14.

The ring-to-ground condition is detected from host no-test trunk 32 during state F by ring-to-ground detector 993. The ring-to-ground condition is duplicated to MLT 42 by the BUSY GENERATOR relay 992.

Tones (480 Hz, 620 Hz, etc.) associated with ring-to-ground conditions are transmitted from the host switch 14, via no-test trunk 32, host applique 30, two-wire channel units 36 and 46, RS applique 40, to MLT 42.

As stated before, the two appliques 30 and 40 are locked in step. Thus, detection of ring-to-ground by applique 30 will result in closure of relay 992 in applique 40. Subsequent opening of ring-to-ground by no-test trunk 32 will result in the opening of relay 992. Thus, flashing of ring-to-ground by no test trunk 32 will result in synchronized flashing of ring-to-ground by applique 40 to MLT 42.

The aforesaid data link is formed by a path linking microcomputer 402, in remote applique 40, universal asynchronous receiver transmitter (UART) 404, modem 406, four wire channel unit 48, dedicated carrier channel 47, four wire channel unit 38, modem 306 at host applique 30, UART 304 and microprocessor 302. The data link operates at 1200 baud, transmitting state and status messages.

Applique 42 also has a ringing genertor 498 for interactive testing by providing the necessary signals for 4-party selective ringing and is connected to a ringing distributor circuit in MLT 42 (not shown).

Sleeve current sensor 310 detects the flow of current in the sleeve lead. In response to messages, indicating the MLT sleeve current flow, received from remote applique 40, microcomputer 302 will operate the appropriate relays in sleeve lead signal generator 320 to provide the correct state which will be repeated to no-test trunk circuit 32: high positive, high negative, low positive, low negative or open circuit.

Figure 5:
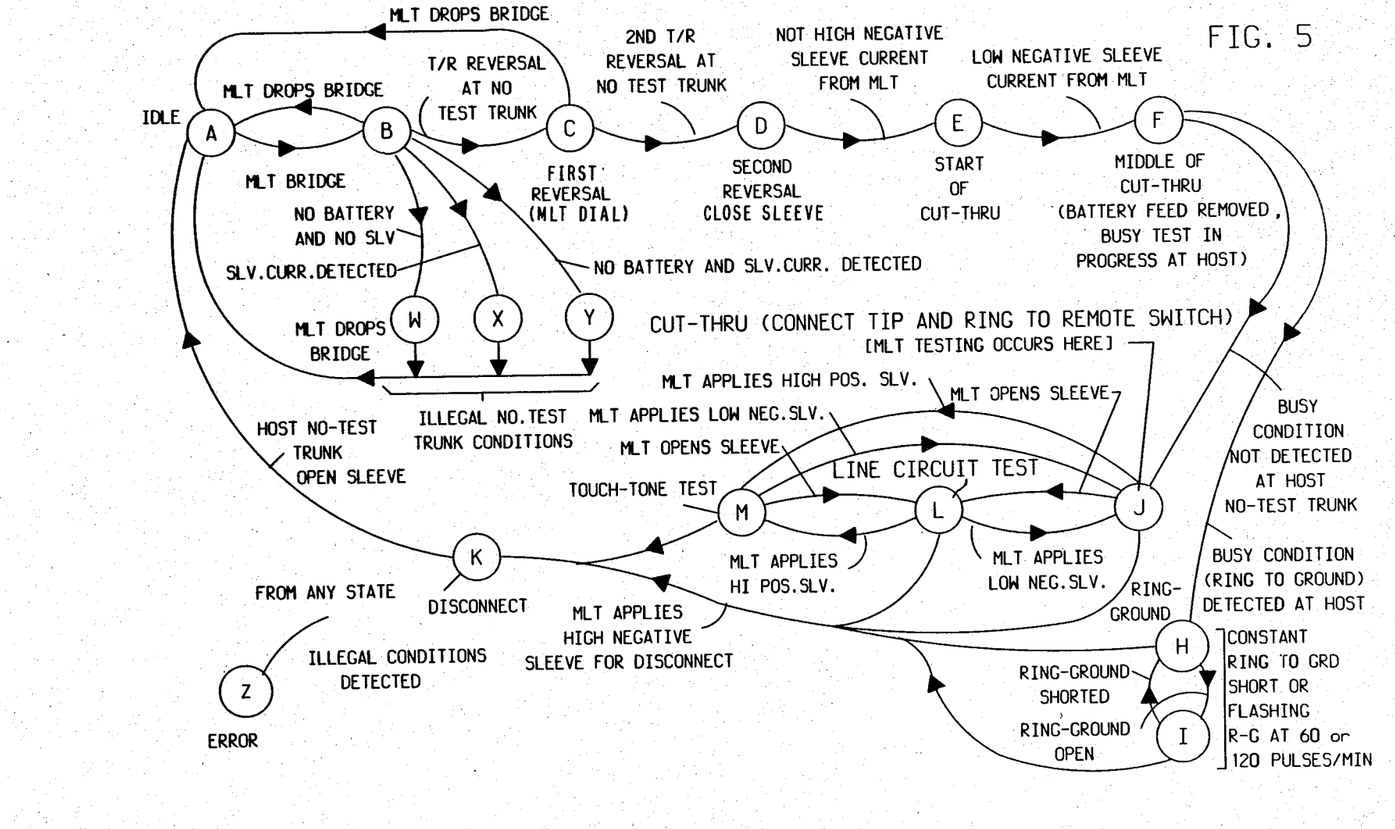
FIGS. 5, 6 and 7 are basic state diagrams for the microcomputers in FIGS. 3 and 4.
Figure 6:
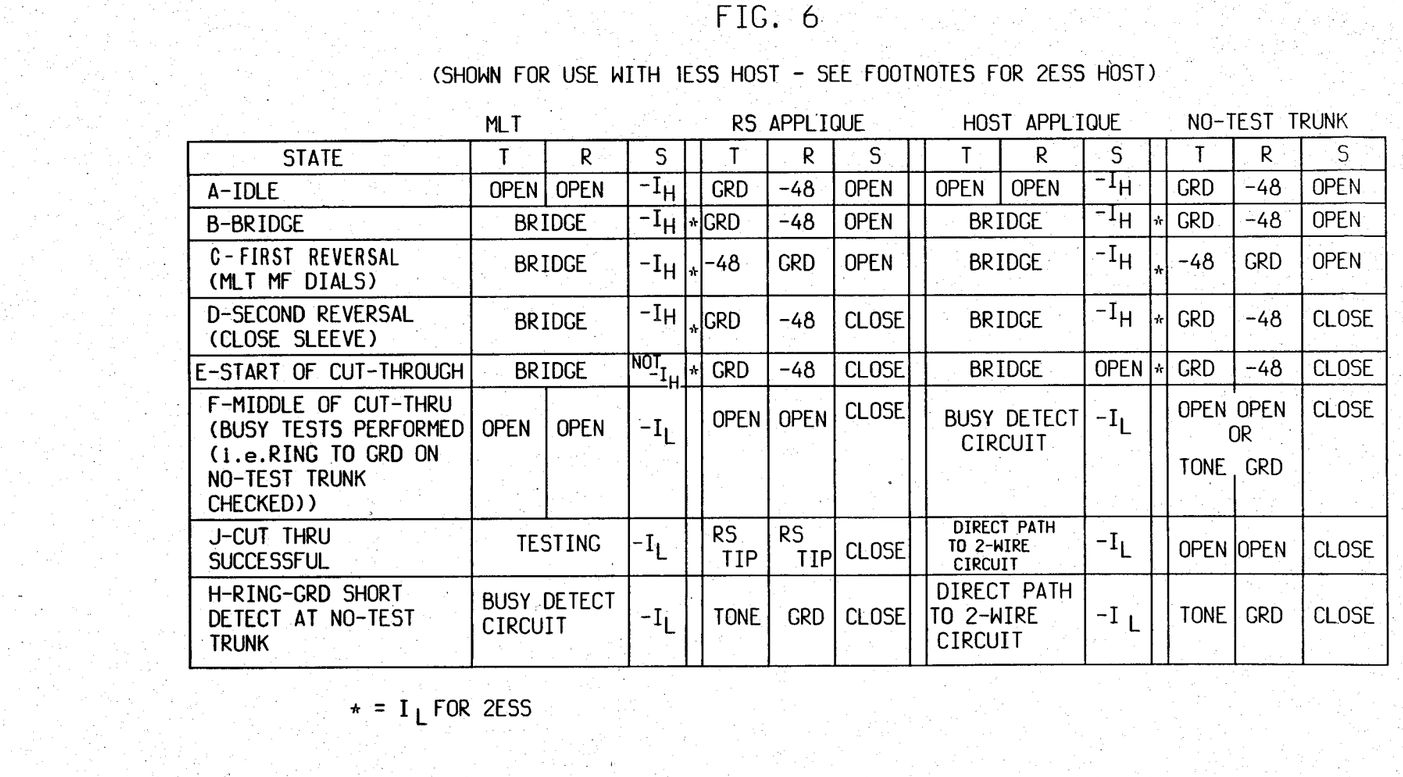
Figure 7:
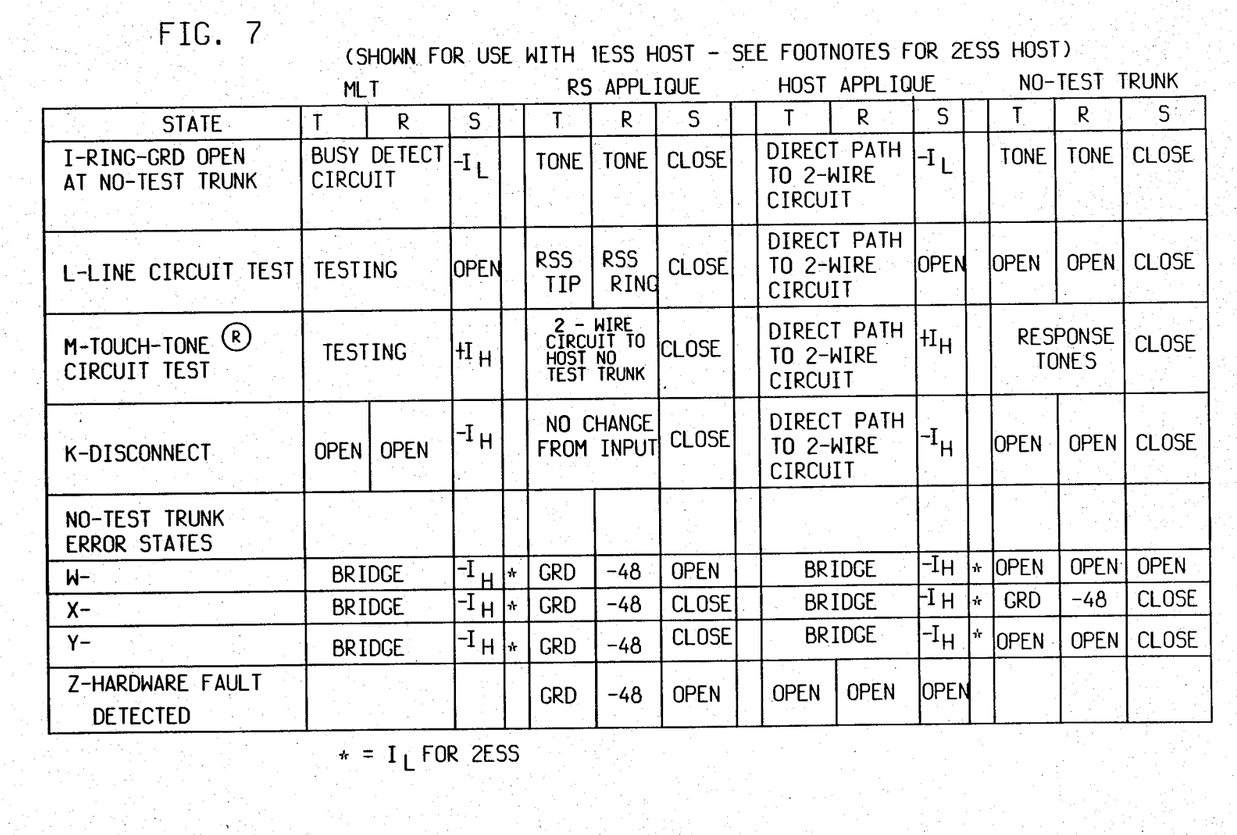

Referring to FIG. 5, there is shown a state diagram of the local metallic access port (LMAP). FIGS. 6 and 7 identifies the potential on the tip, ring and sleeve leads at MLT 42, remote applique 40, host applique 30 and no-test trunk 32. Transitions from one state to another are triggered by either MLT 42 or no-test trunk 32. State transitions may also occur when messages are exchanged between microprocessors 402 and 302. The conditions triggering a particular state change are shown on lines interconnecting two boxes.

Between tests of loops 49, the LMAP system will be in the IDLE state or state A. MLT 42 will have its tip and ring leads open and a low resistance negative battery on its sleeve lead. Remote applique 40 will have ground on tip lead 41, −48 volts on ring lead 43, and sleeve lead 47 to sleeve ground lead 51 will be open. Similar leads at host applique 30 will have similar connections. During IDLE state, STATUS messages will be exchanged between microprocessors 402 and 302 periodically, indicating present state A and next state A.

To initiate testing of loop 49, MLT 42 will bridge on to tip lead 41 and ring lead 43, thereby causing current to flow through sensor 490. In response to the aforesaid current detection, microprocessor 402 will cause a A to B message to be sent to host applique 30, indicating that the present state is A and the next state is B. Host applique 30 will respond to this message by sending a message indicating present state A and next state A. Simultaneously, host applique will duplicate, or repeat, MLT 42's BID for a receiver to the no-test trunk 32.

Host applique 30 will then wait for a message from either host switch 14 or remote applique 40. This message may be a battery reversal from 32 indicating that a receiver has been connected or a B to A message from remote applique 40, indicating that MLT 42 timed out, that is present state B next state A. In one embodiment, MLT 42 checks for battery reversal from host switch 14 every twenty milliseconds for two seconds before it times out.

If a battery reversal is detected, host applique 30 will transmit a B to C message, that is, present state B, next state C. Remote applique 40 will then duplicate this message to MLT 42 and direct the connection of the tip and ring conductors of MLT 42 with no-test trunk 32 via the two-wire carrier circuits 46 and 36 for dialing. No-test trunk 32 will reverse the battery connection in response to MLT 42 being connected to tip and ring. Remote applique 40 will acknowledge the battery reversal at no-test trunk 32 by transmitting a B to C message to host applique 30, that is present state B, next state C.

At this point, MLT 42 will dial the number of the telephone loop to be tested. Host applique 30 will wait for either a second battery reversal, with high negative sleeve current or a C to A message from remote applique 40, indicated by present state C, next state A. As with the first reversal, MLT 42 times out after about two seconds after the ST pulse has been transmitted from MLT 42. If the second reversal is detected, host applique 30 will transmit the C to D message, indicated by present state C, next state D.

Remote applique 40 will mimic the second reversal, connect sleeve to sleeve ground, and wait for MLT 42 to apply low negative sleeve current. When this occurs, the remote applique 40 will transition from the D to E to F states (D=high negative sleeve, E=open sleeve or at least not high negative sleeve, F=low negative sleeve). At each transition, the appropriate present state/next state messages will be exchanged between appliques 30 and 40.

In the F state, the host applique 30 will attach its ring-to-ground detector 993. If within two seconds, a stable ring-to-ground short is detected, the host applique will transmit a F to H message. In turn, the RS applique 40 will short ring-to-ground to MLT 42. If the stable ring-to-ground condition is not detected within the above mentioned two seconds, the host applique will transmit a F to J message indicating cut-through to the loop 49 has been successful.

In the J state, applique 40 will connect the tip and ring conductors 41 and 43, respectively, of MLT 42, to metallic bypass port 44 at remote switch 50. Appliques 30 and 40 remain in state J, periodically (every thirty seconds in the preferred embodiment) exchanging present state J, next state J messages while MLT 42 proceeds through its test series.

Instead of the state F to state J message, it is possible for host applique 30 to detect ground on ring lead 994 from no-test trunk 12, indicating either an overflow or interrupt condition. An overflow condition would be accompanied by alternating ring-to-ground interruptions at 120 interruptions per minute. An interrupt condition would be accompanied by a constant ring-to-ground condition. In any event, a message is sent from the host applique 30 to remote switch (RS) applique 40 indicating present state F, next state H. Accompanying these messages are the AC coupled tones from the host no-test trunk 32, through the host applique 30 through carrier system 45, through RS applique 40 to MLT 42: 480 Hz and 620 Hz for OVERFLOW, or just 480 Hz for INTERCEPT. In the H state, the RS applique 40 will duplicate the ring-to-ground condition to MLT 42. If, in the OVERFLOW condition, the ring-to-ground condition were broken periodically by no-test trunk 32, host applique 30 would detect this and transmit a present state H, next state I message to RS applique 40. Closure of the ring-to-ground condition by no-test trunk 32 would cause the appliques to transition back to the H state. Constant or interrupted ring-to-ground would cause MLT 42 to apply high negative sleeve current to initiate the disconnect sequence.

The aforesaid sleeve current levels are defined by the specifications which follow. Open sleeve means the absolute value of the sleeve current is less than 1.6 milliamperes. High resistance battery means that the absolute value of the sleeve current is greater than 4.1 milliamperes but less than 17 milliamperes. Low resistance battery means the absolute sleeve current is greater than 28.5 milliamperes but less than 80 milli-amperes. Negative battery means sleeve is at a negative potential with respect to sleeve ground. Positive battery means sleeve is at positive potential with respect to sleeve ground. Neither no-test trunk 32 nor RS applique 40 differentiates between high resistance negative battery and high resistance positive battery. The polarity of high resistance battery is used, however, to control common systems equipment used with a no-test trunk.

Transitions from the normal testing state, J, will be normally triggered by a sleeve current change by MLT 42. MLT 42 will open the sleeve conductor 47 to pull in line circuit, such as circuit 26 in FIG. 1, apply high positive sleeve current to set up for a touch tone test, or apply high negative sleeve current to initiate a disconnect.

Opening sleeve lead 47 at MLT 42 will cause remote applique 40 to transmit the message present state J or M, next state L to host applique 30. Appliques 30 and 40 will periodically acknowledge each other's existence, once every thirty seconds, that is indicating present state L and next state L, while MLT 42 performs its line circuit tests. Depending upon the newly selected sleeve current, MLT can either go back to normal loop testing, state J, or transition to TOUCH-TONE ® tests, state M, or disconnect state K.

By applying high positive sleeve current, MLT 42 will initiate the touch tone test state transition sequence. Remote applique 40 will transmit the message: present state J or L, next state M. During TOUCH-TONE ® tests, the tip and ring conductors 41 and 43 from MLT 42 will be connected to no-test trunk 32 through two-wire AC channel units 36 and 46 to allow MLT 42 to hear the result tones or beeps from host switch 14. While appliques 30 and 40 are in the touch tone testing state, they will periodically acknowledge each other with messages indicating present state M, next state M. At the conclusion of the touch tone tests, the MLT will again trigger a state change by altering the sleeve current. Transitions to the states line circuit, state L, normal testing, state J, or disconnect, state K, are legal at this point.

The disconnect sequence is triggered by MLT 42 applying high negative sleeve current. In response, remote applique 40 will transmit the message: present state J or L or M, next state K. This will cause host applique 30 to mimic the high negative sleeve current to host switch 14. When host switch 14 opens the sleeve to sleeve ground connection, host applique 30 will transmit the message: present state K, next state A. Appliques 30 and 40 will then transition to the idle state to await the next loop test request from MLT 42.

If at any time, something unexpected occurs, such as an attempt by one applique to transition to an illegal state, or sleeve current is detected by remote applique 40 while switch 410 is open or the like, the appliques will jump to the ALARM stata Z. If coherent operation cannot be re-established by an exchange of messages in a reasonable amount of time, either or both appliques will close the minor alarm relays to host switch 14. If microcomputers 402 and 302 fail to respond to real time clock (not shown) interrupts properly, the watch-dog timers (not shown) at each applique will also be capable of closing the alarm relays. Manual intervention, repair or the replacement of whatever circuit pack(s) which failed, will then be required to reset the LMAP system to the A or IDLE state.

As stated hereinabove, remote applique 40 and host applique 30 will communicate via a 1200 baud, full duplex serial data communication link. The appliques will be continuously exchanging messages indicating state changes. The communications is based on either a byte or character oriented protocol. Each message consists of four characters: the first being a header character, the second indicating present state, the third indicating the next state, and the last serving as a checksum for the first three. The binary sum of the four characters will be zero.

When an applique transmits a message indicating a state change, the other applique will acknowledge with message indicating its corresponding state change. Once a message is received and is considered valid, the receiving applique will act on it simultaneously with the transmission of the acknowledgement.

Each character will be transmitted in a standard serial frame consisting of one start bit, eight data bits, and one stop bit, for a total of ten bits. At a 1200 baud rate, transmission of a four character message and the four character acknowledgement message from the other side will require 33.3 milliseconds each for a total of 66.6 milliseconds. Since timing in a host-to-remote electronic switching environment is measured in hundreds of milliseconds, this amount of time is not considered excessive. Whereas it is possible to reduce the message length to two characters, by eliminating the header and the checksum, it can be done only at the expense of increasing the probability of errors going undetected.

Should the communications channel be noisy, three attempts at transmitting a message and receiving the acknowledgement could be made in a maximum of 200 milliseconds. As the data link will be full duplex, much less time would be required if an illegal state transition were detected early in a message transmission. As soon as the receiving side detects an error, the ALARM sequence can commence. Once a message is transmitted, the reaction time of an applique will be on the order of tens of milliseconds, including relay and filter settling times.

In FIG. 1, the maximum distance between station set 28 and loop test equipment 10 is about 3000 ohms when the host switch 14 and remote switch 20 are both electronic. When the distance between station set 28 and loop test equipment 10 exceeds this limit, loop test equipment is located nearer the remote switch 20. The maximum limit remains, however, at about 3000 ohms when the two offices are electronic. Loop test equipment 42, as in FIG. 2, does not have to be located at remote switch 50 so long as the distance between station set 52 and test equipment 42 remains within the aforesaid limit. Typically, the distance between station set 52 and remote switch 50 is less than 1500 ohms and the distance between remote switch 50 and loop test equipment 42 is less than 1500 ohms.

Figure 8:
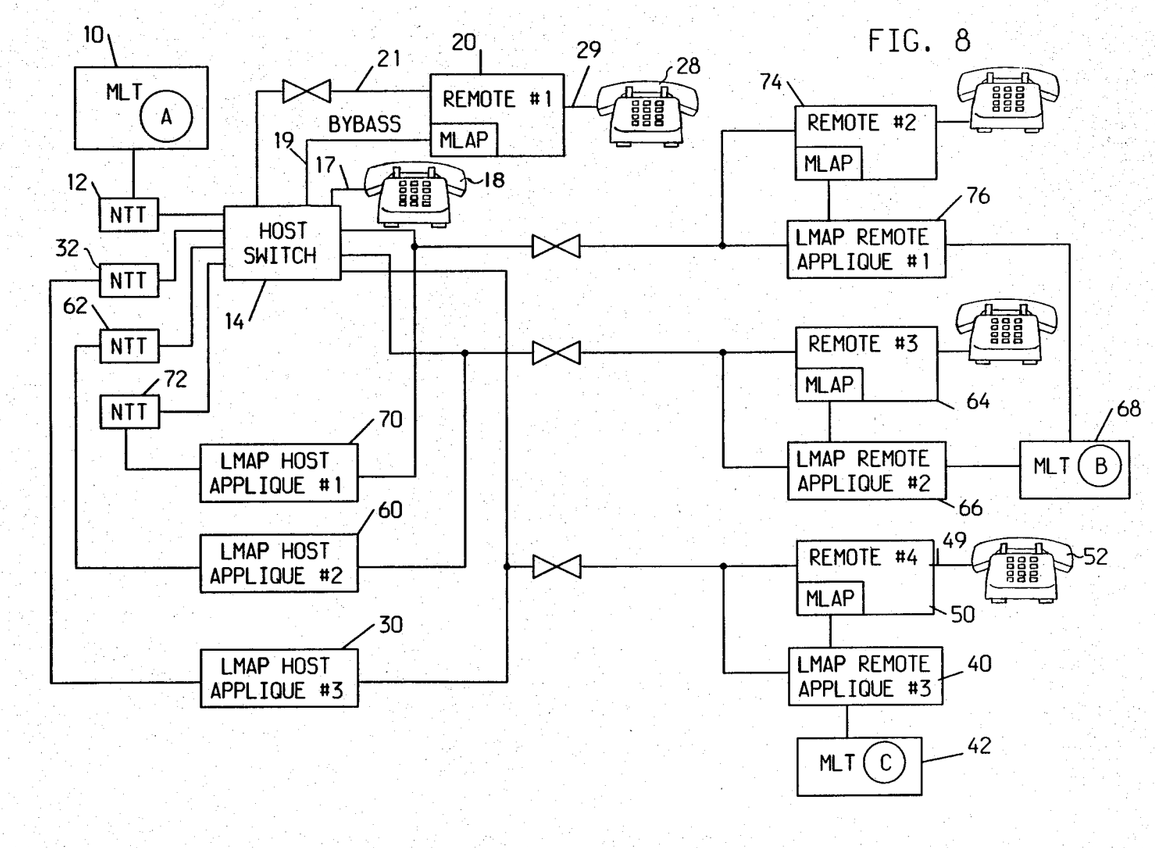
FIG. 8 shows an arrangement for sharing test equipment among many remote switches.

Thus, in one embodiment as shown in FIG. 8 there is shown a loop test equipment, MLT 68 which is within the aforesaid 1500 ohms from remote switch 64 and from remote switch 74. MLT 68 performs mechanized tests for loops homing on remote switch 64 and for loops homing on remote switch 74.

Figure 9:
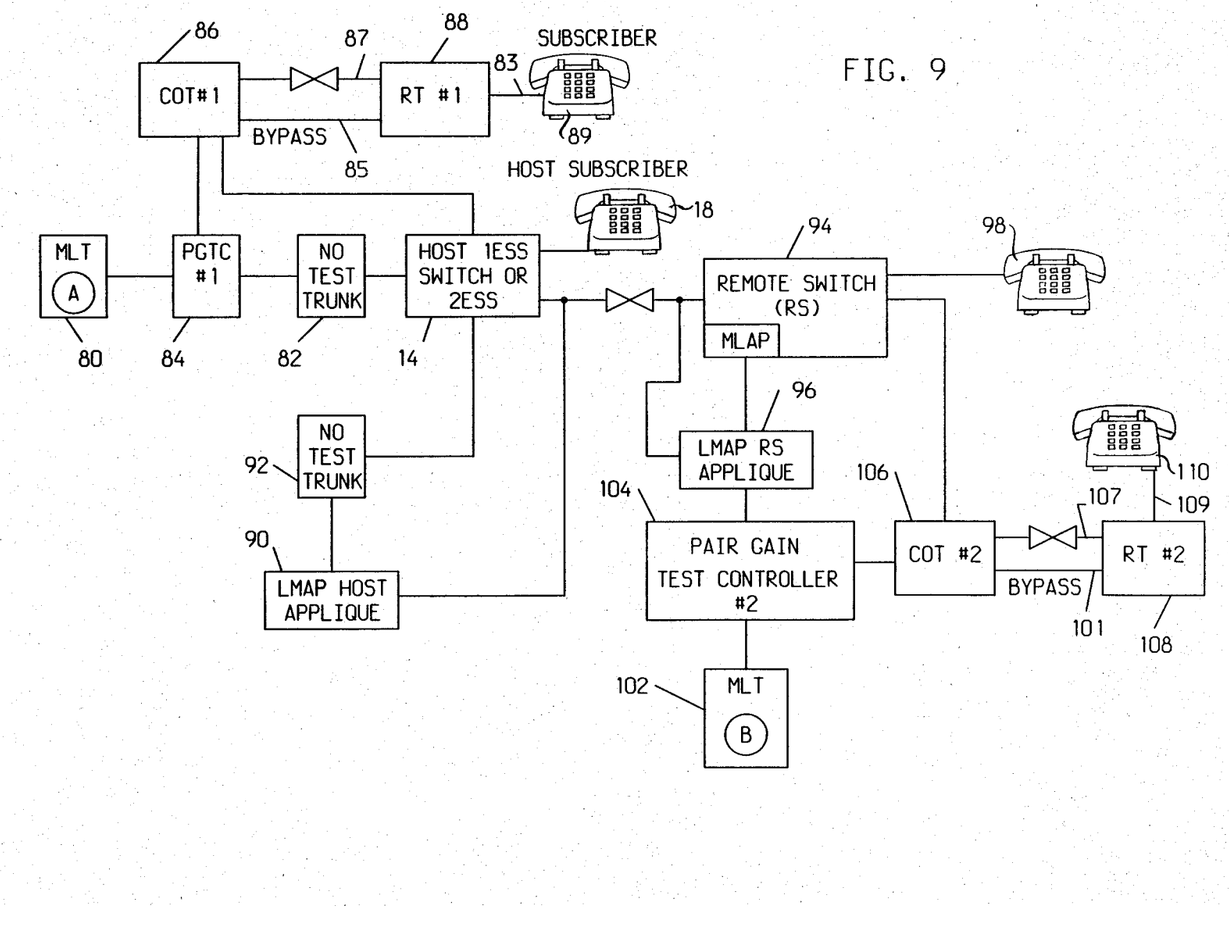
FIG. 9 shows an arrangement for use with pair gain systems.

Referring to FIG. 9, there is shown an arrangement for mechanized loop testing of pair gain systems which home on remote telephone switch 94. More particularly, a first pair gain system comprising central office terminal (COT) 86, carrier system 87 and remote terminal 88 is shown homing directly on host switch 14. Remote terminal 88 supports a plurality of stations represented by set 89. Interposed between MLT 80 and no-test trunk 82 is a pair gain test controller (PGTC) 84. Metallic path 85 provides for testing loop 83 which terminates station set 89 at remote terminal 88.

Also shown in FIG. 9 is a pair gain system comprising COT 106, carrier system 107 and RT 108 homing on remote switch 94. MLT 102 performs tests on loops 109 which connect station sets, represented by set 110, to RT 108 via metallic bypass 101.

What is claimed is:

1. Apparatus for interconnecting a mechanized loop test equipment with any one of a plurality of telephone loops, one end of said telephone loops being terminated at a remote telephone switch, the other end of said telephone loops being connected to terminal equipment, said remote telephone switch being inter-connected with a host telephone switch via a carrier system, the distance between said host switch and said terminal equipment exceeding a predetermined threshold value, said apparatus comprising
   a remote applique circuit, located at said remote switch, for providing a metallic path between said mechanized loop test equipment and said remote switch and for repeating signals between said mechanized loop test equipment and a host applique circuit, the distance between said terminal equipment and said mechanized loop test equipment being less than said predetermined threshold value, and
   said host applique circuit, located at said host switch, for providing a path between said mechanized loop test equipment and a no-test trunk circuit located at said host switch, and for repeating signals between said no-test trunk and said remote applique circuit.

2. The apparatus of claim 1 further comprising a data link between said host applique circuit and said remote applique circuit using a dedicated carrier channel in said carrier system, each of said applique circuits comprising in series
   a control circuit comprising a microcomputer for receiving input signals and sending output signals to diverse components in said applique circuits,
   a universal asynchronous receiver, transmitter (UART), and
   a modem, said modem being connected via four conductors to a four wire channel unit in said carrier system to form a first dedicated carrier channel, said data link being used for the transfer of status messages between said host applique circuit and said remote applique circuit.

3. The apparatus of claim 2 wherein said status message comprises four characters, the first being a constant header character, the second indicating the present state, the third indicating the next state, and the last serving as a checksum for the first three, the binary sum of the four characters being zero, each of said characters being sent in a frame comprising one start bit, eight data bits, and one stop bit.

4. The apparatus of claim 2 wherein said remote applique circuit comprises
   a current sensor for detecting current flow from tip to ring conductors when said mechanized loop test equipment bridges on to said tip and ring conductors of said remote applique, thereby requesting a message to be sent to said host switch requesting a receiver to be assigned for receiving the address of the telephone loop and in response thereto for causing said remote switch to establish a direct metallic testing path between said mechanized loop test equipment and said addressed telephone loop, and
   a pair of switches for reversing the connection of negative battery and ground from tip and ring leads, respectively, in response to a message received from said host switch for indicating to said mechanized loop test equipment that a receiver has been assigned.

5. The apparatus of claim 4 wherein said remote applique circuit further comprises an alternating current path to said mechanized loop test equipment for repeating the address of the telephone loop to be tested via a second dedicated carrier channel in said carrier system, said second channel comprising a pair of two wire channel units.

6. The apparatus of claim 5 wherein said remote applique circuit further comprises
   a sleeve switch, and
   a sleeve lead current sensor for monitoring state changes in said mechanized loop test equipment and transferring to said microcomputer control circuit any one of five state changes comprising open, low negative current, low positive current, high negative current, and high positive current.

7. The apparatus of claim 6 wherein said remote applique further comprising a switch for disconnecting said tip to ring current sensor from the tip and ring leads of said mechanized loop test equipment and for connecting said tip and ring leads of said mechanized loop test equipment directly with the tip and ring leads of said remote switch.

8. The apparatus of claim 7 wherein said mechanized loop test equipment is shared by a plurality of remote switches, each switch having its own remote applique circuit.

9. The apparatus of claim 7 wherein said telephone loops are terminated at a remote terminal of a subscriber carrier system instead of being terminated at said remote switch and the central office terminal of said subscriber carrier system being terminated at said remote switch, the test path between said mechanized loop test equipment and said loop being established by said remote switch under control of said host switch and said path comprising said mechanized loop test equipment, a pair gain test controller, a metallic path, said remote subscriber loop carrier terminal and said loop.

10. The apparatus of claim 2 wherein said host applique circuit comprises
    a host tip to ring bridge circuit to repeat the connection of a similar bridge by said mechanized loop test equipment across the tip and ring conductors of said remote applique circuit, and
    a host tip to ring current sensor for detecting the direction of flow of current between said host tip and ring conductors in response to said host bridge circuit being connected across said host tip and ring conductors in order to detect the polarity of battery and ground across said host tip and ring conductors.

11. The apparatus of claim 10 wherein said host applique circuit further comprises
    a host sleeve current sensor, and
    a host sleeve lead signal generator for transferring state changes between said no-test trunk circuit and said mechanized loop test equipment.

12. The apparatus of claim 11 wherein said host applique circuit further comprises a host alternating current path via a two-wire carrier channel for sending overflow messages from said host switch to said mechanized loop test equipment and multifrequency tones from said mechanized loop test equipment to said host switch.

13. The apparatus of claim 12 wherein said host switch has associated therewith a separate host applique circuit for each remote switch.

14. A method for establishing a metallic test path between a mechanized telephone loop test apparatus located remotely form a host telephone switch and any one of a plurality of telephone loops which are connected to a remote telephone switch, said remote switch being connected with said host switch via a carrier channel, the distance between said host telephone switch and the end of any one of said telephone loops exceeding a predetermined threshold distance, said test apparatus being associated with said remote telephone switch, said method comprising the steps of
    initiating a request for a multifrequency receiver from said test apparatus to said host switch,
    responding to said request from said host switch to said test apparatus,
    sending the address of the telephone loop to be tested from said test apparatus to said receiver when said receiver is available for receiving said address, and
    said host switch causing said remote switch to establish a connection between said test apparatus and said addressed telephone loop the distance between said test apparatus and the end of any one of said loops being less than said predetermined threshold.

* * * * *